United States Patent
Lotter et al.

(10) Patent No.: US 9,461,428 B2
(45) Date of Patent: Oct. 4, 2016

(54) LOW-COST OFFSET STACKED POWER CONNECTOR

(75) Inventors: Eric Michael Lotter, San Jose, CA (US); Eric Michael McSherry, San Jose, CA (US); Brian Roger Loiler, Santa Clara, CA (US); David Andrew Chapman, San Jose, CA (US); Anthony Jose Morales, Jr., Aptos, CA (US); An Nguyen, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 207 days.

(21) Appl. No.: 13/415,588

(22) Filed: Mar. 8, 2012

(65) Prior Publication Data

US 2013/0235516 A1 Sep. 12, 2013

(51) Int. Cl.
| | |
|---|---|
| *H01R 12/00* | (2006.01) |
| *H01R 27/02* | (2006.01) |
| *H01R 12/70* | (2011.01) |
| *G06F 1/18* | (2006.01) |
| *H01R 13/627* | (2006.01) |

(52) U.S. Cl.
CPC .............. *H01R 27/02* (2013.01); *G06F 1/185* (2013.01); *G06F 1/189* (2013.01); *H01R 12/7088* (2013.01); *H01R 13/6273* (2013.01)

(58) Field of Classification Search
CPC .............. H01R 27/02; H01R 13/6273; H01R 12/7088; G06F 1/189; G06F 1/185
USPC ........ 439/55, 541.5, 607.23, 607.54, 607.01, 439/939, 660
See application file for complete search history.

(56) References Cited

U.S. PATENT DOCUMENTS

| | | | |
|---|---|---|---|
| 4,978,317 A | 12/1990 | Pocrass | |
| 5,080,609 A * | 1/1992 | Fabian et al. | ............... 439/541.5 |
| 5,574,625 A | 11/1996 | Ohgami et al. | |
| 5,601,451 A | 2/1997 | Driones et al. | |
| 5,704,802 A | 1/1998 | Loudermilk | |
| 5,816,826 A * | 10/1998 | Colemen | .......................... 439/64 |
| 5,841,635 A | 11/1998 | Sadler et al. | |
| 5,885,100 A | 3/1999 | Talend et al. | |

(Continued)

FOREIGN PATENT DOCUMENTS

TW 201251227 12/2012

OTHER PUBLICATIONS

RCA connector; Copyright 2000-2004, TechTarget; 3 Sheets; http://searchNetworking.techtarget.com/sDefinition/0,,sid7.sub.-gci786116,00.html.

(Continued)

*Primary Examiner* — Jean F Duverne

(57) ABSTRACT

Embodiments of the present invention may be directed to an electronic connector. More specifically, the electronic connector may include a single connector body and a mounting end operable to couple the single connector body with an electronic board of an electronics unit. The electronic connector may also include a lower jack portion disposed in the single connector body and include multiple lower pin receptacles, where the lower jack portion is disposed adjacent to the mounting end and is operable to receive a first connector end of a first cable. The electronic connector may further include an upper jack portion disposed in the single connector body and include multiple upper pin receptacles, where the upper jack portion is disposed above the lower jack portion and is operable to receive a second connector end of a second cable.

15 Claims, 8 Drawing Sheets

(56) References Cited

U.S. PATENT DOCUMENTS

| | | |
|---|---|---|
| 5,924,889 A | 7/1999 | Wang |
| 5,995,373 A | 11/1999 | Nagai |
| 6,224,408 B1 | 5/2001 | Wu |
| 6,224,409 B1 | 5/2001 | Chang |
| 6,227,905 B1 | 5/2001 | Tsai et al. |
| 6,234,833 B1 | 5/2001 | Tsai et al. |
| 6,257,934 B1 | 7/2001 | Gong et al. |
| 6,290,517 B1 | 9/2001 | Anderson |
| 6,301,468 B1 | 10/2001 | Slayton et al. |
| 6,346,013 B1 | 2/2002 | Zhang et al. |
| 6,364,717 B1 | 4/2002 | Lin |
| 6,409,530 B1 | 6/2002 | Zhao et al. |
| 6,482,044 B1 | 11/2002 | Ma et al. |
| 6,491,533 B2 | 12/2002 | Costello et al. |
| 6,561,847 B1 | 5/2003 | Xiang et al. |
| 6,568,963 B2 | 5/2003 | Zhang et al. |
| 6,572,402 B2 | 6/2003 | Lin |
| 6,575,793 B1 | 6/2003 | Li et al. |
| 6,618,636 B1 | 9/2003 | Sakai et al. |
| 6,688,908 B2 | 2/2004 | Wallace |
| 6,857,897 B2 | 2/2005 | Conn |
| 6,971,907 B1 | 12/2005 | Stroud |
| 6,980,422 B2 | 12/2005 | Bhogal |
| 7,133,040 B1 | 11/2006 | Abdallah et al. |
| 7,278,879 B2 * | 10/2007 | Kim et al. ............... 439/540.1 |
| 7,452,220 B2 | 11/2008 | Reid et al. |
| 7,510,423 B1 | 3/2009 | Stroud |
| 7,811,122 B2 * | 10/2010 | Clark et al. ............... 439/534 |
| 7,916,466 B2 | 3/2011 | Cheng et al. |
| 8,067,701 B2 | 11/2011 | Keiper et al. |
| 8,342,325 B2 | 1/2013 | Rayner |
| 8,513,522 B2 | 8/2013 | Liang |
| 8,949,485 B1 | 2/2015 | Li et al. |
| 2003/0043110 A1 | 3/2003 | Chaves et al. |
| 2004/2242087 | 12/2004 | Hoshina |
| 2005/0157454 A1 | 7/2005 | Peng et al. |
| 2009/0174993 A1 | 7/2009 | Lin |
| 2010/0134964 A1 | 6/2010 | Smith et al. |
| 2011/0013372 A1 | 1/2011 | Kang |
| 2011/0096483 A1 | 4/2011 | Sapper et al. |
| 2011/0261519 A1 | 10/2011 | Chiu et al. |
| 2012/0040539 A1 * | 2/2012 | Enge et al. ............... 439/55 |
| 2012/0063079 A1 | 3/2012 | Yeh |
| 2013/0036846 A1 | 2/2013 | Griffin et al. |
| 2013/0070400 A1 | 3/2013 | Huang et al. |
| 2013/0107465 A1 | 5/2013 | Huang et al. |
| 2014/0181345 A1 | 6/2014 | Huang et al. |

OTHER PUBLICATIONS

S/PDIF; Copyright 2004, Jupitermedia; 2 Sheets; http://www.webopedia.com/TERM/S/S.sub.-PDIF.html.

Smart 5.1 Mainboard; Intelligent 6 Channel Audio, The Technology Behind The Feature, Enabling Smart5.1, Availability; 2001-2003 VIA Technologies, Inc; 4 Sheets; http://www.viaarena.com/?PageID=162.

AC '97 Component Specification, Revision 2.3 Rev 1.0; 1.3 AC '97 Codec Block Diagram; p. 10; 1 Sheet.

AC '97 Component Specification, Revision 2.3 Rev 1.0; 1.4 Integrating AC '97 into the System; p. 11; 1 Sheet.

Tech Inside; S/PDIF (Sony/Philips Digital Interface) Connector; 1 Sheet; http://english.aopen.com.tw/tech/techinside/spdif.htm., Mar. 11, 2004.

SigmaTel Announces the low-Cost STAC9752A C-Major Audio Codec for Cost Sensitive PC Applications; 2 Sheets; http://www.sigmatel.com/press/010604-stac9752-introduction.htm. ., Jan. 6, 2004.

Tech Inside; S/PDIF (Sony/Philips Digital Interface) Connector; 1 Sheet; http://english.aopen.com.tw/tech/techinside/spdif.htm. printed Mar. 11, 2004.

SigmaTel Announces the low-Cost STAC9752A C-Major Audio Codec for Cost Sensitive PC Applications; 2 Sheets; http://www.sigmatel.com/press/010604-stac9752-introduction.htm. printed Mar. 9, 2004.

* cited by examiner

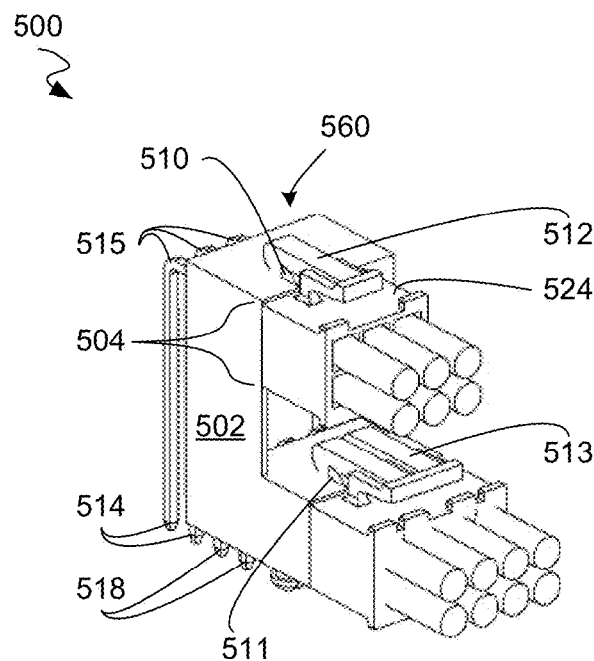
FIG. 5A
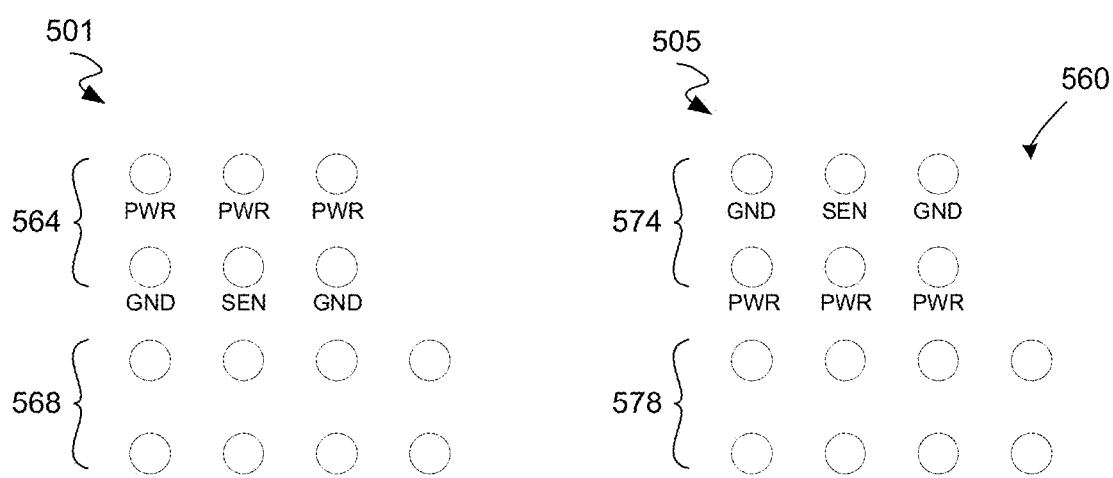
FIG. 5B
FIG. 5C

LOW-COST OFFSET STACKED POWER CONNECTOR

BACKGROUND OF THE INVENTION

Graphics cards commonly receive electrical power from a computer system board, for example, through a PCI Express (PCIe) connection. However, as the processing power of video cards has increased, so has their requirements for power. At the same time, computer system boards are often limited in the amount of power that they may provide. For example, the PCIe specification limits the power supply from the computer system board to 75 Watts.

As a result, graphics cards that require more power may receive power from sources other than a computer system board, for example, graphics cards may receive power directly from a power supply unit. Such graphics cards may connect with the power supply unit through a connector that is separate from the connector that connects the graphics card to the computer system board.

Some graphics cards may require so much power that two separate connectors are required. While the demand for graphics cards with a smaller form factor increases, the printed circuit boards included in the graphics cards become more densely populated. At the same time, manufacturers prefer to accommodate graphics card standards and specifications that require specific sizes and placement of the connectors, for example, the PCIe specification. For this reason, some graphics cards may include two printed circuit boards that are positioned in parallel, where each board may include a connector that is positioned across from the other connector. However, including two separate connectors is costly and disconnecting at least one of the connectors may be difficult without the use of a tool when the connectors are positioned across from each other.

Other graphics cards include only one board that may include two connectors 104 and 108 positioned side-by-side (see FIG. 1A). Such a side-by-side connector configuration 110 may consume valuable area on the board (see FIG. 1B). In addition, such a side-by-side connector configuration may disadvantageously affect the placement or quality of a cooling fan 106 (see FIG. 1B). For example, due to inherent factors in graphics card design and other limitations such as specification limitations or OEM requirements, the power connectors may be located either directly under or directly adjacent to the fan 106. The former location directly affects the geometry of the fan 106, while the latter location indirectly affects fan size by impacting the shape of a scroll 106, which may be necessary on blower-style fans to help develop air flow effectively.

Moreover, as the power consumption of graphics cards has increased, manufacturers have relied on larger fans to cool components of the graphics card. The fan size may be limited by the size and location of the power connectors. In addition, a connector may encroach on a portion of the scroll of the fan, requiring the scroll to include an indentation or inset portion. As a result, the airflow of the fan may be obstructed, causing inefficient air flow and acoustic noise in the environment.

While some specifications may permit the use of an adapter that couples a standard connector to a proprietary connector which attempts to address these issues, such an adapter may be prohibitively costly and less convenient for a user.

BRIEF SUMMARY OF THE INVENTION

Accordingly, a need exists for a low-cost connector that may provide more power with a smaller footprint, may be compatible with industry standards without the use of an adapter, and is easier and less costly to manufacture. Additionally, a need exists for a connector, e.g., for a graphics subsystem card, that may be easier for a user to disconnect plugs from and also is easier and less costly to manufacture. Embodiments of the present invention provide novel solutions to these needs and others as described below.

Embodiments of the present invention may be directed to an electronic connector. More specifically, the electronic connector may include a single connector body and a mounting end operable to couple the single connector body with an electronic board of an electronics unit. The electronic connector may also include a lower jack portion disposed in the single connector body and include multiple lower pin receptacles, where the lower jack portion is disposed adjacent to the mounting end and is operable to receive a first connector end of a first cable. The electronic connector may further include an upper jack portion disposed in the single connector body and include multiple upper pin receptacles, where the upper jack portion is disposed above the lower jack portion and is operable to receive a second connector end of a second cable.

In one embodiment, an electronic connector includes a connector body and a mounting end operable to couple the connector body with an electronic board of an electronics unit. The electronic connector may also include a lower jack portion disposed in the connector body and include multiple lower pin receptacles, where the lower jack portion is disposed adjacent to the mounting end and is operable to receive a first connector end of a first cable. The electronic connector may further include an upper jack portion disposed in the connector body and include multiple upper pin receptacles, where the upper jack portion is disposed above the lower jack portion and is operable to receive a second connector end of a second cable, and further where a lower mating plane defined by the lower jack portion is offset from an upper mating plane defined by the upper jack portion.

Other embodiments of the present invention may be directed to graphics card. More specifically, the graphics card may include an electronic board, a graphics processor unit, a fan, and an electronic connector. The electronic connector may include a connector body and a mounting end operable to couple the connector body with the electronic board. The electronic connector may also include a lower jack portion disposed in the connector body and include multiple lower pin receptacles, where the lower jack portion is disposed adjacent to the mounting end and is operable to receive a first connector end of a first cable. The electronic connector may further include an upper jack portion disposed in the connector body and include multiple upper pin receptacles, where the upper jack portion is disposed above the lower jack portion and is operable to receive a second connector end of a second cable.

BRIEF DESCRIPTION OF THE DRAWINGS

The present invention is illustrated by way of example, and not by way of limitation, in the figures of the accompanying drawings and in which like reference numerals refer to similar elements.

FIG. 5A shows a perspective view of an exemplary offset stacked power connector with a rotated upper jack portion and exposed solder tails in accordance with one embodiment of the present invention.

FIG. 5B shows a pin diagram of an exemplary offset stacked power connector in accordance with one embodiment of the present invention.

FIG. 5C shows a pin diagram of an exemplary offset stacked power connector with a rotated upper jack portion and exposed solder tails in accordance with one embodiment of the present invention.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Figure 1A:
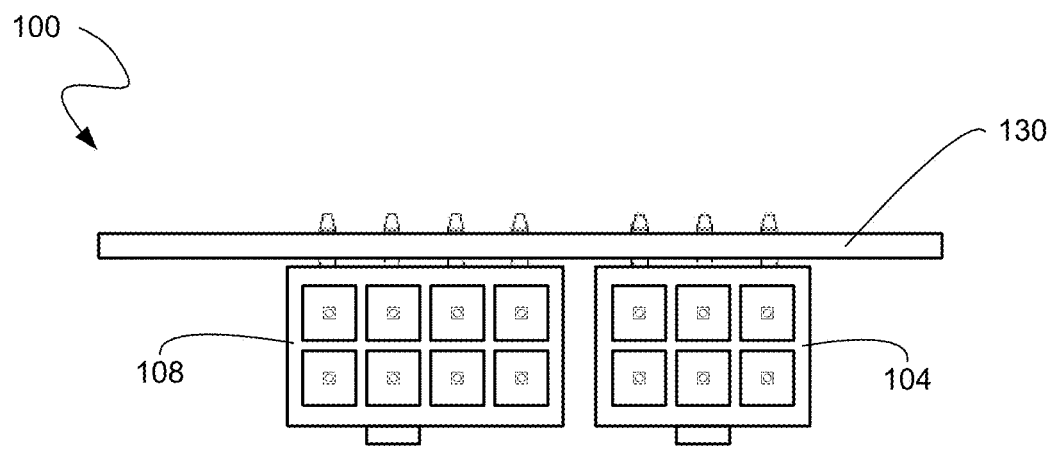
FIG. 1A shows a prior art side-by-side power connector configuration on a printed circuit board.
Figure 1B:
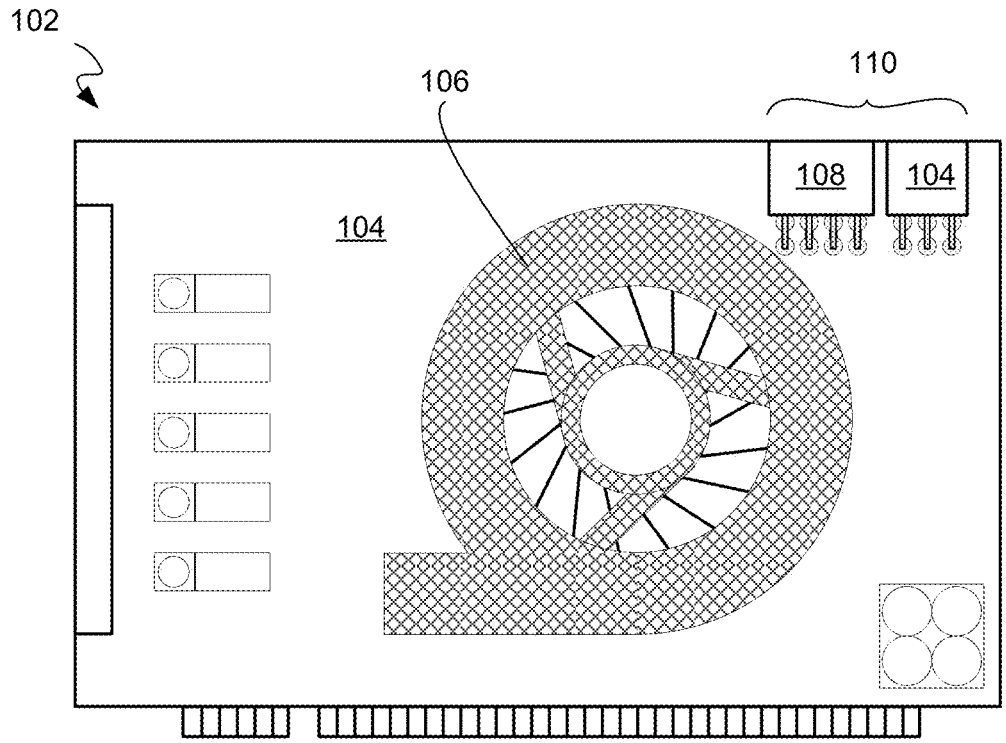
FIG. 1B shows a prior art side-by-side power connector configuration on a graphics card.
Figure 1C:
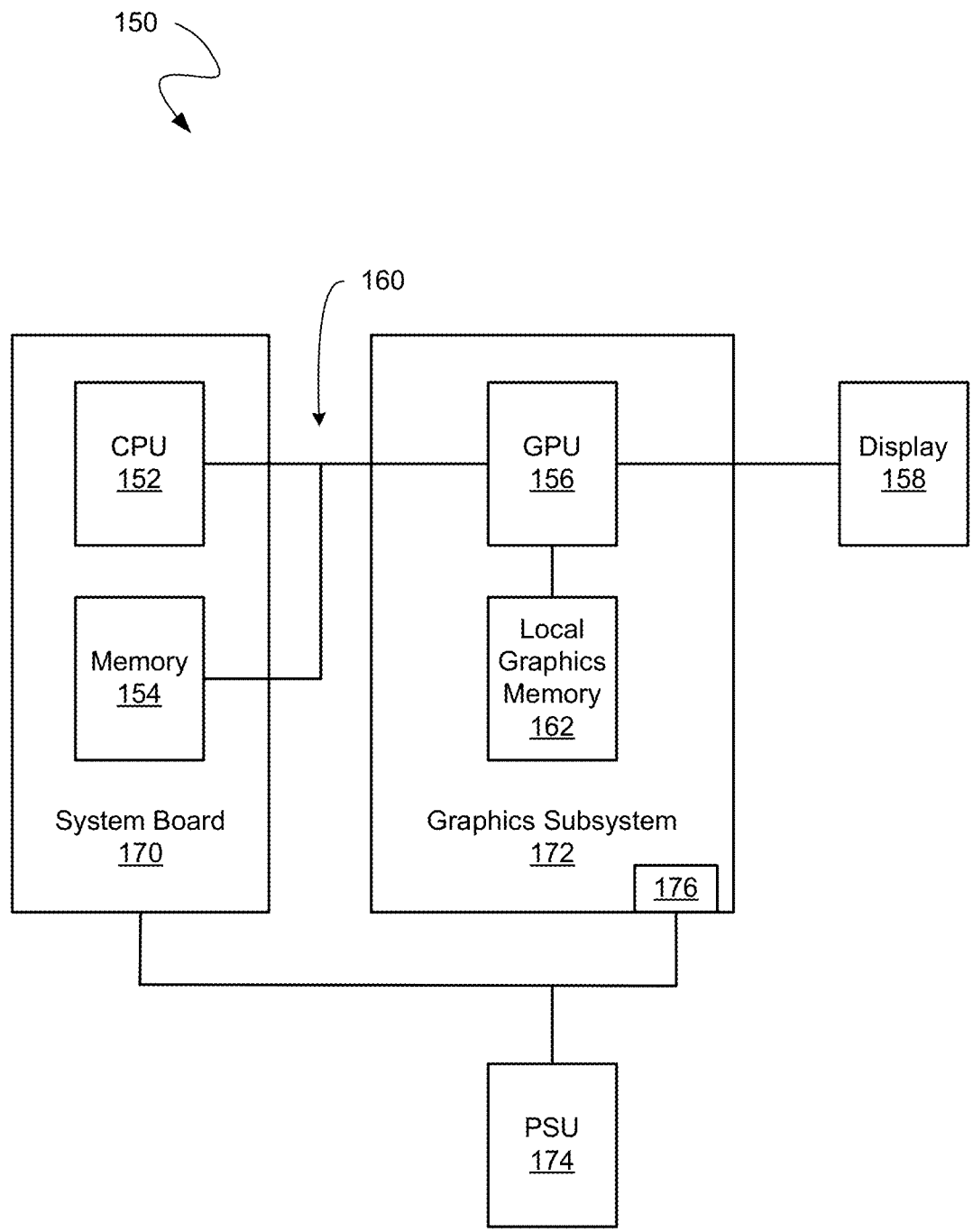
FIG. 1C shows an exemplary computer system, in accordance with one embodiment of the present invention.

FIG. 1C shows an exemplary computer system 150 in accordance with one embodiment of the present invention. Computer system 150 depicts the components in accordance with embodiments of the present invention providing the execution platform for certain hardware-based and software-based functionality. In general, computer system 150 comprises a system board 170 including at least one central processing unit (CPU) 152 and a system memory 154. The CPU 152 can be coupled to the system memory 154 via a bridge component/memory controller (not shown) or can be directly coupled to the system memory 154 via a memory controller (not shown) internal to the CPU 152.

Computer system 150 also comprises a graphics subsystem 172 including at least one graphics processor unit (GPU) 156. For example, the graphics subsystem 172 may be included on a graphics card. The graphics subsystem 172 may be coupled to a display 158. One or more additional GPUs can optionally be coupled to system 150 to further increase its computational power. The GPU(s) 156 may be coupled to the CPU 152 and the system memory 154 via a communication bus 160. The GPU 156 can be implemented as a discrete component, a discrete graphics card designed to couple to the computer system 150 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 162 may be coupled with the GPU 156 for high bandwidth graphics data storage, e.g., the frame buffer.

A power source unit (PSU) 174 may provide electrical power to the system board 170 and graphics subsystem 172. The PSU 174 may couple with the graphics subsystem 172 through power cables and/or power connectors that connect with a power connector 176 in the graphics subsystem 172. For example, the power connector 176 may be a connector on the edge of a graphics card that is operable to couple with power cables extending from the PSU 174.

The CPU 152 and the GPU 156 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 156 can also be implemented in, and performed by, a suitably equipped CPU 152. Additionally, while embodiments herein may make reference to a GPU, it should be noted that the described circuits and/or functionality can also be implemented and other types of processors (e.g., general purpose or other special-purpose coprocessors) or within a CPU.

System 150 can be implemented as, for example, a desktop computer system or server computer system having a powerful general-purpose CPU 152 coupled to a dedicated graphics rendering GPU 156. In such an embodiment, components can be included that add peripheral buses, specialized audio/video components, IO devices, and the like. Similarly, system 150 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 150 can also be implemented as a "system on a chip", where the electronics (e.g., the components 152, 154, 156, 162, and the like) of a computing device are wholly contained within a single integrated circuit die. Examples include a hand-held instrument with a display, a car navigation system, a portable entertainment system, and the like.

Embodiments of the present invention provide a low-cost connector that may provide more power with a smaller footprint on a graphics card. However, embodiments of the present invention can be applied to provide any type of electrical signal, including data signals. In addition, embodiments of the present invention can be applied to other devices, for example, on a motherboard.

Embodiments of the present invention allow a connector to occupy less area on a printed circuit board (PCB), thereby allowing for smaller PCBs, the inclusion of more components on the PCB, and/or more positioning options for components on the PCB, thereby providing better fan placement options and geometry. For example, a fan used for cooling a (GPU) may be larger or better positioned to more effectively cool the GPU.

Additionally, embodiments of the present invention provide a connector that may be easier for a user to disconnect plugs from and also easier and less costly to manufacture. Embodiments of the present invention may achieve these and other novel improvements while complying with industry standard specifications without the use of an adapter.

Figure 2A:
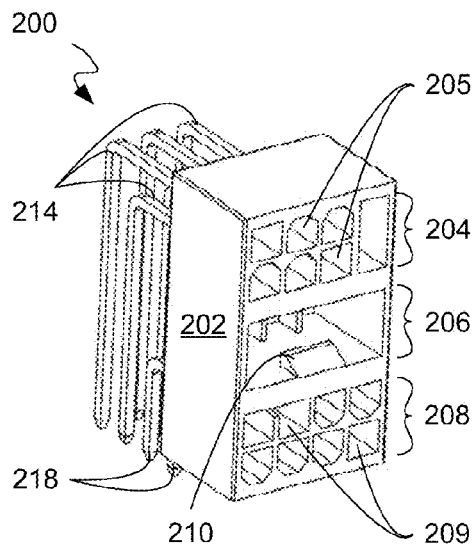
FIG. 2A shows a perspective view of an exemplary stacked power connector in accordance with one embodiment of the present invention.

FIG. 2A shows a perspective view of an exemplary stacked power connector 200 in accordance with one embodiment of the present invention. The stacked power connector 200 may include a connector body 202 with an upper jack portion 204, a latch portion 206, and a lower jack portion 208.

The connector body 202 may be formed by a single and continuous material. For example, the connector body 202 may be formed by a single piece of plastic material. Accordingly, the connector body 202 may include multiple jack portions in a single body. For example, the upper jack portion 204 may be stacked above the lower jack portion 208 inside the single connector body 202. Consequently, the connector body 202 lowers cost since a single and continuous connector body costs less to manufacture than two individual connectors. However, it should be appreciated that in other embodiments, the connector body 202 may be formed by separate materials.

The upper jack portion 204 is operable to interconnect or mate with a connector plug (see FIG. 2B) that provides electrical power and/or data signals. For example, as depicted in FIG. 2A, the upper jack portion 204 may include multiple pin receptacles 205 that allow the upper jack portion 204 to mate with a connector plug that may include multiple pins (see FIG. 2B). In other embodiments, the upper jack portion 204 may instead include multiple pins that allow the upper jack portion 204 to mate with a connector plug that may include multiple pin receptacles. It should be appreciated that the upper jack portion 204 may include other means for mating with a connector plug (e.g. coaxial connectors, genderless connectors, etc.).

The latch portion 206 may include a cavity with latch keepers or strikes 210 (see also FIG. 2C) for securing connector plugs (see FIG. 2B) that may have mated with the upper jack portion 204 or the lower jack portion 208. For example, the latch portion 206 may include a latch keeper 210 for the lower jack portion 208 and another latch keeper (see FIG. 2C) for the upper jack portion 204.

Similar to the upper jack portion 204, the lower jack portion 208 is operable to mate with a connector plug (see FIG. 2B) that provides electrical power and/or data signals. For example, as depicted in FIG. 2A, the lower jack portion 208 may include multiple pin receptacles 209 that allow the lower jack portion 208 to mate with a connector plug that may include multiple pins (see FIG. 2B). In other embodiments, the lower jack portion 208 may instead include multiple pins that allow the lower jack portion 208 to mate with a connector plug that may include multiple pin receptacles. It should be appreciated that the lower jack portion 208 may include other means for mating with a connector plug (e.g. coaxial connectors, genderless connectors, etc.).

It should be appreciated that the upper jack portion 204 and lower jack portion 208 may include a different number of pin receptacles 205 and 209. For example, as depicted in FIG. 2A, the upper jack portion 204 may include six pin receptacles 205 and the lower jack portion 208 may include eight pin receptacles 209. It should also be appreciated that the upper jack portion 204 and lower jack portion 208 may include different means for mating with a connector plug. For example, the upper jack portion 204 may include multiple pins while the lower jack portion 208 may include multiple pin receptacles.

Figure 3A:
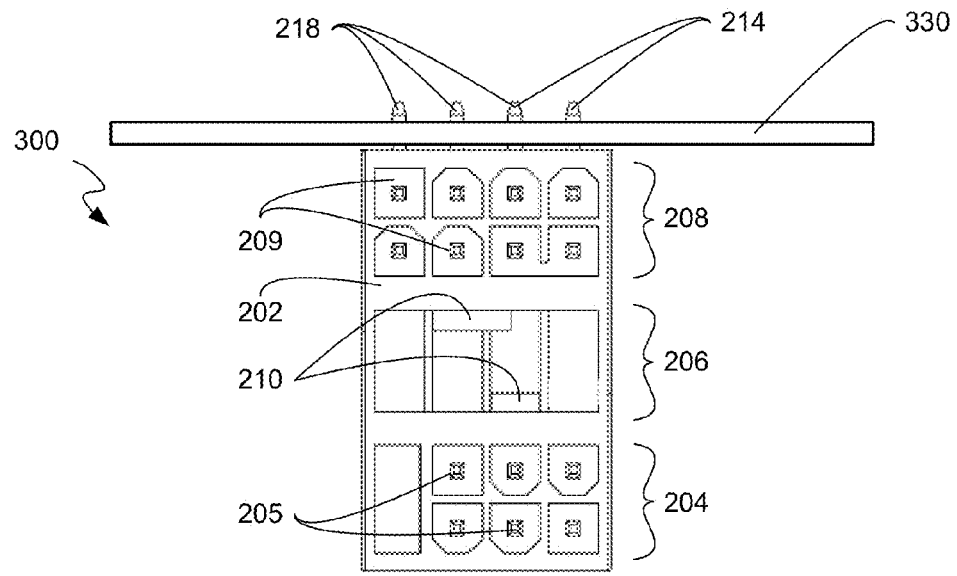
FIG. 3A shows a top view of an exemplary stacked power connector on a printed circuit board in accordance with one embodiment of the present invention.
Figure 3B:
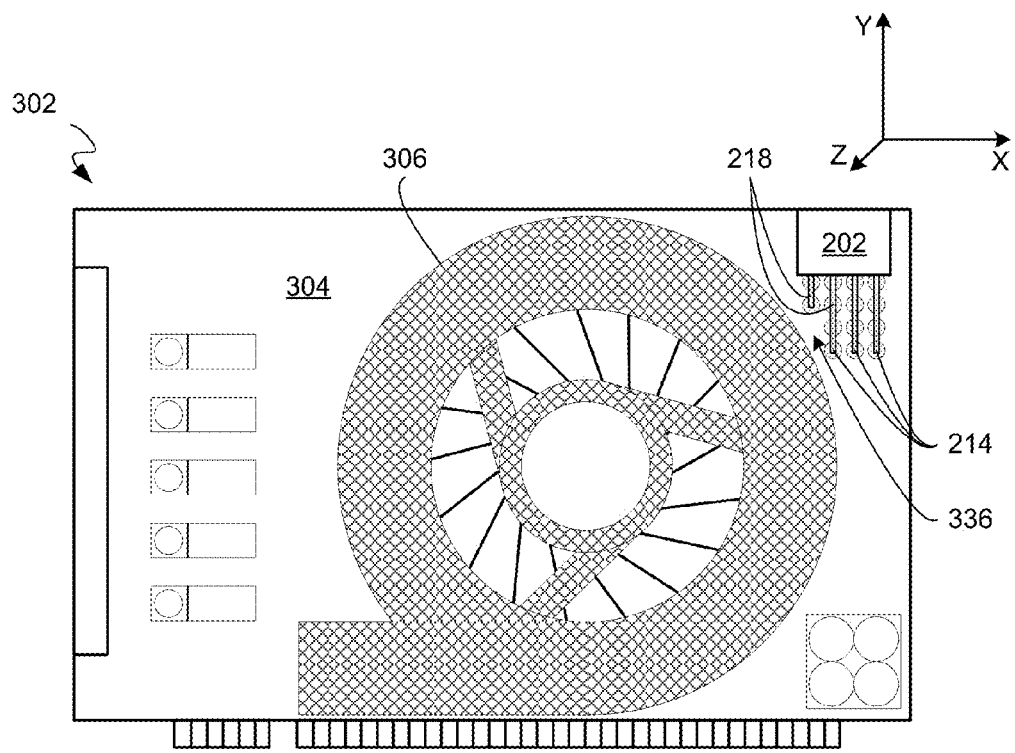
FIG. 3B shows a front view of an exemplary stacked power connector on a graphics card in accordance with one embodiment of the present invention.

The stacked power connector 200 may include solder tails that are operable to electrically couple a connector plug with a printed circuit board (see FIGS. 3A-3B). For example, the upper solder tails 214 may extend from the upper jack portion 204 to a printed circuit board (PCB). One pin of the upper solder tails 214 may correspond to one pin receptacle of the upper jack portion 204. Accordingly, when a connector plug has mated with the upper jack portion 204, a connector plug pin may be electrically coupled with the PCB through one pin of the upper solder tails 214.

Similar to the upper solder tails 214, the lower solder tails 218 may extend from the lower jack portion 208 to the PCB. One pin of the lower solder tails 218 may correspond to one pin receptacle of the lower jack portion 208. Accordingly, when a connector plug has mated with the lower jack portion 208, a connector plug pin may be electrically coupled with the PCB through one pin of the lower solder tails 218. In some embodiments, the connector body 202 may include less material by not fully enclosing the solder tails 214 and 218. As a result, the connector body 202 may reduce manufacturing cost in comparison to a connector body that does enclose solder tails since less material may be used.

Figure 2B:
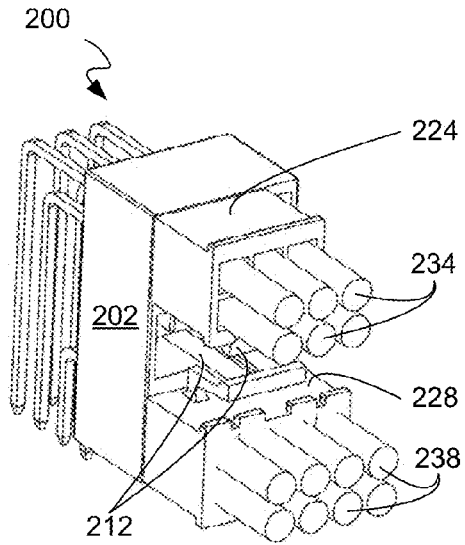
FIG. 2B shows a perspective view of an exemplary stacked power connector with connector plugs in accordance with one embodiment of the present invention.

FIG. 2B shows a perspective view of the exemplary stacked power connector 200 with connector plugs 224 and 228 in accordance with one embodiment of the present invention. The connector body 202 of FIG. 2B may be similar to the connector body 202 of FIG. 2A.

The upper connector plug 224 may include connector cables 234 that provide electrical power and/or data signals. The upper connector plug 224 may mate with the upper jack portion 204 of the connector body 202. As a result, the connector cables 234 may contact the upper solder tails 214 inside the pin receptacles 205 (FIG. 2A). Similarly, the lower connector plug 228 may include connector cables 238 that provide electrical power and/or data signals. The lower connector plug 228 may mate with the lower jack portion 208 of the connector body 202. As a result, the connector cables 238 may contact the lower solder tails 218 inside the pin receptacles 209.

The connector plugs 224 and 228 may include latches 212 that are operable to secure the connector plugs 224 and 228 with the upper jack portion 204 or lower jack portion 208 (see FIG. 2A). For example, when the connector plug 228 mates with the lower jack portion 208, the latch 212 may extend beyond and fall past the rear of the latch keeper 210 (see FIG. 2A). As a result, the latch 212 and latch keeper 210 will secure the connector plug 228 until the latch 212 is actuated and thereby released from the latch keeper 210. It should be appreciated that other means for securing connector plugs with jacks may be used.

Figure 2C:
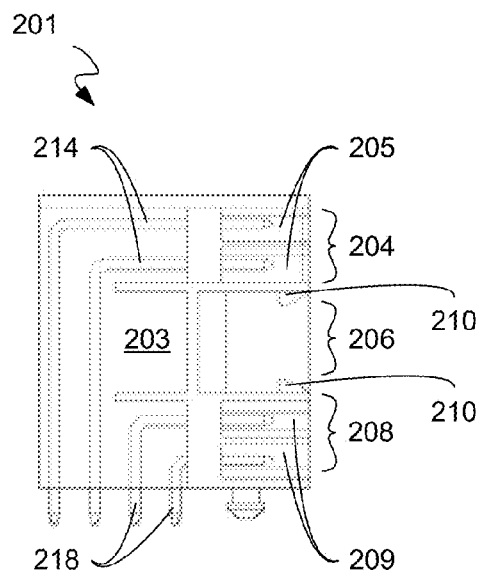
FIG. 2C shows a side view of an exemplary stacked power connector in accordance with one embodiment of the present invention.

FIG. 2C shows a side view of an exemplary stacked power connector 201 in accordance with one embodiment of the present invention. The connector body 203 of FIG. 2C may be similar to the connector body 202 of FIG. 2A. However, the connector body 203 of FIG. 2C demonstrates that the solder tails 214 and 218 may be enclosed up to the PCB connection or mounting area of the connector body 203 by the connector body 203 to protect the solder tails from inadvertent contact (e.g., by a user, other components, etc.) in some embodiments.

Figure 2D:
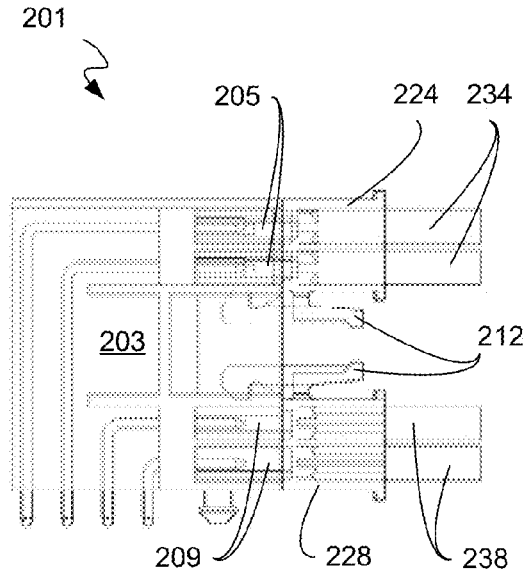
FIG. 2D shows a side view of an exemplary stacked power connector with connector plugs in accordance with one embodiment of the present invention.

The upper jack portion 204 may include the pin receptacles 205 and the lower jack portion 208 may include the pin receptacles 209 for making electrical contact with a connector plug (see FIG. 2D). The upper solder tails 214 extend from the rear of the connector body 203 and into the pin receptacles 205, allowing a connector plug to electrically couple with a PCB. Similarly, the lower solder tails 218 extend from the rear of the connector body 203 and into the pin receptacles 209, allowing a connector plug to electrically couple with a PCB.

Latch keepers 210 may be included in the cavity of the latch portion 206 formed between the upper jack portion 204 and lower jack portion 208. A latch keeper 210 may be positioned adjacent to each of upper jack portion 204 and lower jack portion 208 for securing a connector plug.

FIG. 2D shows a side view of the exemplary stacked power connector 201 with connector plugs 224 and 228 in accordance with one embodiment of the present invention. The connector body 203 of FIG. 2D may be similar to the connector body 203 of FIG. 2C.

The upper connector plug 224 may include connector cables 234 that provide electrical power and/or data signals. The upper connector plug 224 may mate with the upper jack portion 204 of the connector body 203. As a result, the connector cables 234 may contact the upper solder tails 214 inside the pin receptacles 205. Similarly, the lower connector plug 228 may include connector cables 238 that provide electrical power and/or data signals. The lower connector plug 228 may mate with the lower jack portion 208 of the connector body 203. As a result, the connector cables 238 may contact the lower solder tails 218 inside the pin receptacles 209.

The connector plugs 224 and 228 may include latches 212 that are operable to secure the connector plugs 224 and 228 with the upper jack portion 204 or lower jack portion 208 (see FIG. 2C). For example, when the connector plug 228 mates with the lower jack portion 208, the latch 212 may extend beyond and fall past the rear of the latch keeper 210 (see FIG. 2C). As a result, the latch 212 and latch keeper 210 will secure the connector plug 228 until the latch 212 is actuated and thereby released from the latch keeper 210.

As a result, since the stacked power connectors 200 and 201 may be capable of mating with the same standardized power connector plugs that may mate with the prior art connectors 104 and 108 of FIG. 1A, the stacked power connectors 200 and 201 may continue to comply with industry standards without the use of an adapter.

FIG. 3A shows a top view of an exemplary stacked power connector 300 on a printed circuit board 330 in accordance with one embodiment of the present invention. The connector body 202 of FIG. 3A may be similar to the connector body 200 of FIG. 2A. Accordingly, the connector body 202 may include an upper jack portion 204, a latch portion 206, and a lower jack portion 208. The upper jack portion 204 may include pin receptacles 205, the latch portion 206 may include latch keepers 210, and the lower jack portion 208 may include pin receptacles 209. The stacked power connector 300 may be mounted on a PCB 330. Accordingly, the solder tails 214 and 218 may extend at least partially through the mounting vias in the PCB 330.

Since the upper jack portion 204 and the lower jack portion 208 are stacked, it should be appreciated that the stacked power connector 300 occupies much less space on the surface of the PCB 330 as compared to the prior art side-by-side connector configuration 100 of FIG. 1A. For example, the stacked power connector 300 occupies only the area on the PCB 330 required for one connector as opposed to multiple connectors. In addition, the stacked power connector 300 eliminates any gap that was required between multiple connectors.

FIG. 3B shows a front view of an exemplary stacked power connector 202 on a graphics card 304 in accordance with one embodiment of the present invention. The stacked power connector 202 may be similar to the stacked power connector 202 of FIG. 2A, the stacked power connector 201 of FIG. 2C, or the stacked power connector 202 of FIG. 3A.

Since the stacked power connector 202 of FIG. 3B occupies much less area on the graphics card 304 than the prior art side-by-side power connector configuration 110 of FIG. 1B, much more area is available for positioning a fan or scroll 306. In an embodiment, the fan or scroll may be much larger than prior art fans. For example, the fan or scroll 306 may be much larger than the fan or scroll 106 in the prior art side-by-side connector configuration 102 of FIG. 1B. As a result, the fan or scroll 306 may be better sized to more effectively cool graphics card 304 components including a GPU.

Figure 3C:
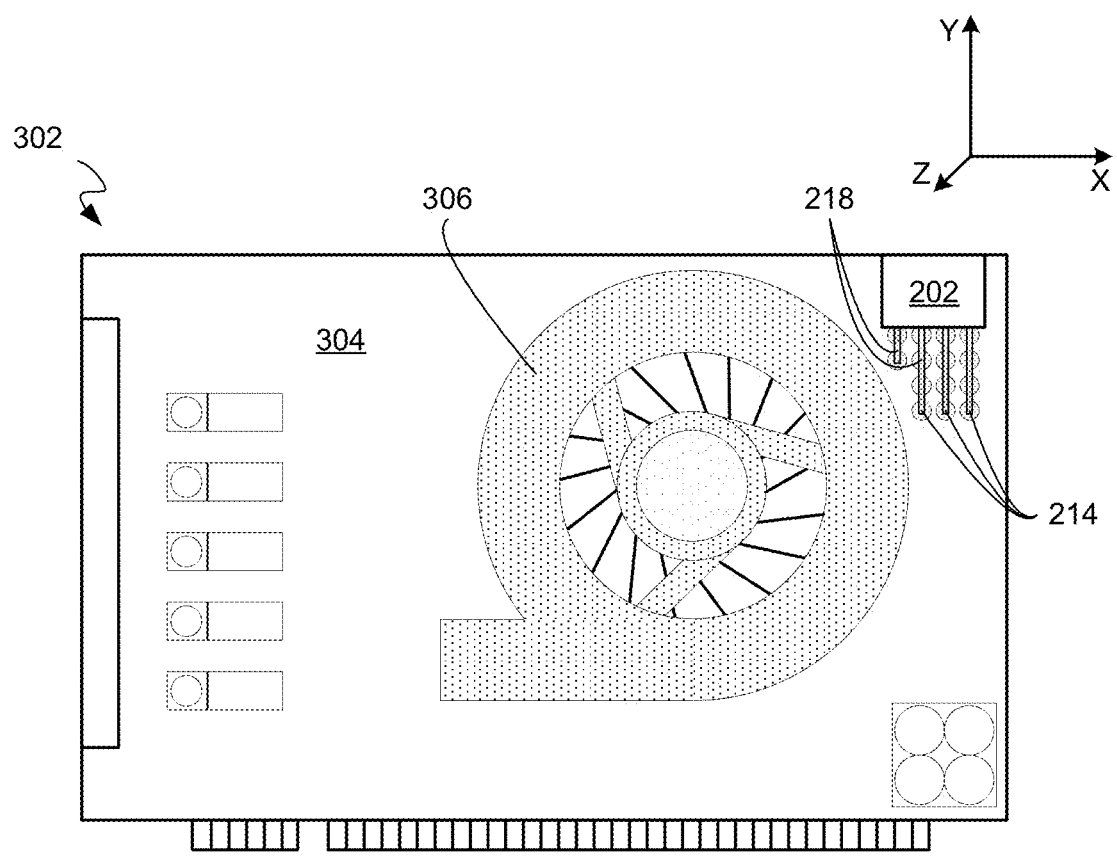
FIG. 3C shows a front view of an exemplary stacked power connector on a graphics card in accordance with one embodiment of the present invention.

FIG. 3C shows a front view of an exemplary stacked power connector 202 on a graphics card 304 in accordance with one embodiment of the present invention. In some embodiments, since much more area is available with the use of the exemplary stacked power connector 202, the fan or scroll 306 may be positioned in more locations than with the prior art side-by-side connector configuration 110 of FIG. 1B.

For example, the fan or scroll 306 may be positioned higher in the Y-direction toward the top of the graphics card 304. As a result, the fan or scroll 306 may be better positioned to more effectively cool graphics card 304 components including a GPU. In some embodiments, the fan or scroll 306 may be positioned farther in the X-direction toward the right side of the graphics card 304. As a result, the fan or scroll 306 may be better positioned to more effectively cool graphics card 304 components including a GPU.

In various embodiments, if a stacked power connector may include jack portions with a different number of pin receptacles, the jack portion with the least amount of pin receptacles may be positioned farthest away from the mounting end of the stacked power connector that mounts on a PCB. As a result, the stacked power connector may occupy less area on the graphics card by requiring less mounting area for solder tails.

For example, in FIG. 2C, the upper jack portion 204 with 6 pin receptacles 205 may include fewer pin receptacles than the lower jack portion 208 with 8 pin receptacles 209. In addition, the upper jack portion 204 with 6 pin receptacles 205 may be positioned farthest away from the mounting end of the stacked power connector 202 that mounts on the PCB 330. Since the upper jack portion 204 is positioned closest to the mounting area, the corresponding upper solder tails 214 extend farther to the rear than do the lower solder tails 218. Further, since the upper solder tails 214 that extend farther are fewer in number than the lower solder tails 218, the stacked power connector 202 occupies less space.

As illustrated in FIG. 3B, since there are fewer upper solder tails 214 than lower solder tails 218, an area 336 is unoccupied by the solder tails of the stacked power connector 202 since the lower solder tails 218 do not extend to the area 336 and there are no upper solder tails 214 that correspond to the area 336. Accordingly, the fan or scroll 306 may be positioned farther in the X- or Y-direction and into the area 336.

Figure 4A:
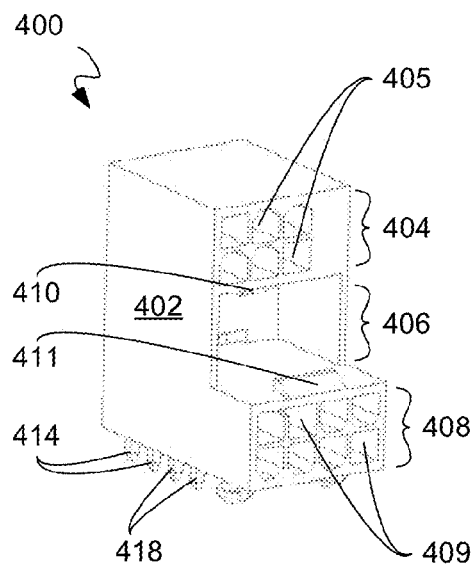
FIG. 4A shows a perspective view of an exemplary offset stacked power connector in accordance with one embodiment of the present invention.

FIG. 4A shows a perspective view of an exemplary offset stacked power connector 400 in accordance with one embodiment of the present invention. The offset stacked power connector 400 may be similar to the stacked power connector 200 of FIG. 2A. For example, the connector body 402 may include an upper jack portion 404, a latch portion 406, and a lower jack portion 408. The connector body 402 may be formed in a single and continuous body. Accordingly, the connector body 402 may include multiple jack portions in a single body.

The upper jack portion 404 may include pin receptacles 405, the latch portion 406 may include latch keepers 410 and 411, and the lower jack portion 408 may include pin receptacles 409. The upper solder tails 414 may extend from a PCB mounting area to the pin receptacles 405 and the lower solder tails 418 may extend from the PCB mounting area to the pin receptacles 409.

However, the upper jack portion 404 and the latch portion 406 may be recessed with respect to the lower jack portion 408. For example, an upper mating plane defined by the mating face of the upper jack portion 404 may be positioned farther toward the rear of the offset stacked power connector 400 with respect to a lower mating plane defined by the mating face of the lower jack portion 408. As a result, the offset stacked power connector 400 may include jack portions that are offset with respect to one another.

Since the upper jack portion 404 may be recessed, the latch keeper 410 that corresponds to the upper jack portion 404 may also be recessed with respect to the latch keeper 411 that corresponds to the lower jack portion 408. It should be appreciated that the lower jack portion 408 may instead be recessed with respect to the upper jack portion 404 in some embodiments.

Figure 4B:
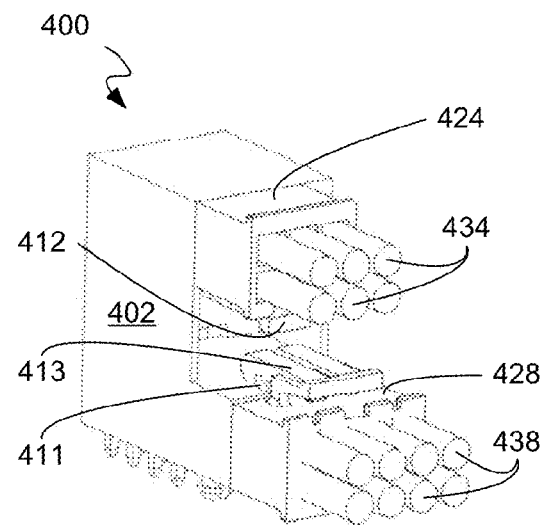
FIG. 4B shows a perspective view of an exemplary offset stacked power connector with connector plugs in accordance with one embodiment of the present invention.

FIG. 4B shows a perspective view of the exemplary offset stacked power connector 400 with connector plugs 424 and 428 in accordance with one embodiment of the present invention. The connector body 402 of FIG. 4B may be similar to the connector body 402 of FIG. 4A.

The upper connector plug 424 may include connector cables 434 that provide electrical power and/or data signals. The upper connector plug 424 may mate with the upper jack portion 404 of the connector body 402. As a result, the connector cables 434 may contact the upper solder tails 414 inside the pin receptacles 405. Similarly, the lower connector plug 428 may include connector cables 438 that provide electrical power and/or data signals. The lower connector plug 428 may mate with the lower jack portion 408 of the connector body 402. As a result, the connector cables 438 may contact the lower solder tails 418 inside the pin receptacles 409.

The connector plugs 424 and 428 may include latches 412 that are operable to secure the connector plugs 424 and 428 with the upper jack portion 404 or lower jack portion 408 (see FIG. 4A). For example, when the connector plug 428 mates with the lower jack portion 408, the latch 413 may extend beyond and fall past the rear of the latch keeper 411 (see FIG. 4A). As a result, the latch 413 and latch keeper 411 will secure the connector plug 428 until the latch 413 is actuated and thereby released from the latch keeper 411. It should be appreciated that other means for securing connector plugs with jacks may be used.

Figure 4C:
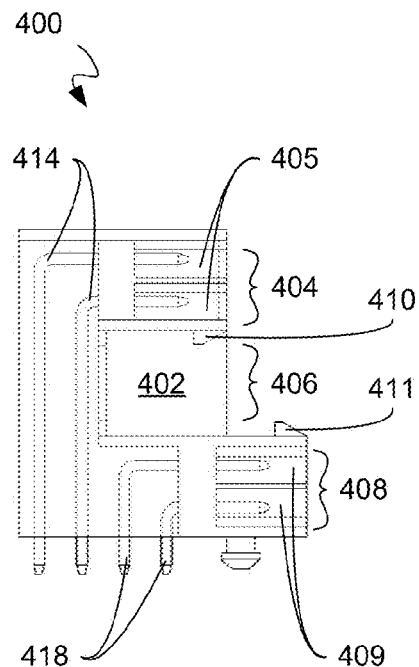
FIG. 4C shows a side view of an exemplary offset stacked power connector in accordance with one embodiment of the present invention.

FIG. 4C shows a side view of the exemplary offset stacked power connector 400 in accordance with one embodiment of the present invention. The connector body 402 of FIG. 4C may be similar to the connector body 402 of FIG. 4A.

The upper jack portion 404 and the latch portion 406 may be recessed with respect to the lower jack portion 408. For example, the plane of the face of the upper jack portion 404 may be positioned farther toward the rear of the offset stacked power connector 400 with respect to the plane of the face of the lower jack portion 408. As a result, the offset stacked power connector 400 may include jack portions that are offset with respect to one another.

Since the upper jack portion 404 may be recessed, the latch keeper 410 that corresponds to the upper jack portion 404 may also be recessed with respect to the latch keeper 411 that corresponds to the lower jack portion 408. It should be appreciated that the lower jack portion 408 may instead be recessed with respect to the upper jack portion 404 in some embodiments.

Figure 4D:
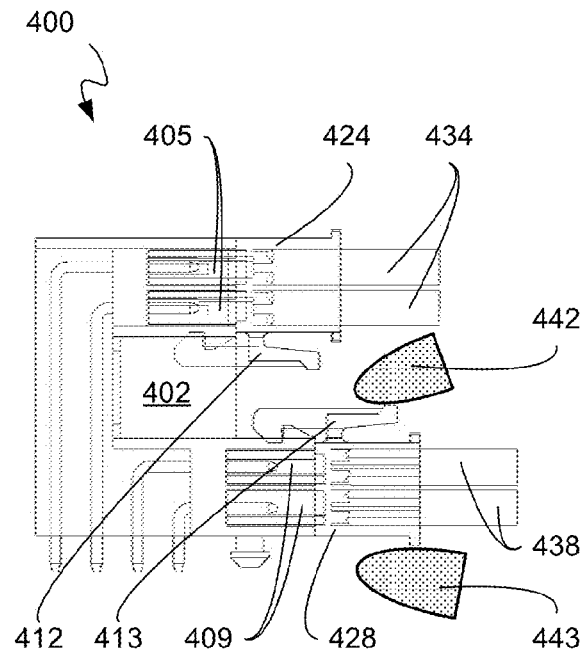
FIG. 4D shows a side view of an exemplary offset stacked power connector with connector plugs in accordance with one embodiment of the present invention.

FIG. 4D shows a side view of the exemplary offset stacked power connector 400 with connector plugs 424 and 428 in accordance with one embodiment of the present invention. The connector body 402 of FIG. 4D may be similar to the connector body 402 of FIG. 4A.

The upper connector plug 424 and the lower connector plug 428 may be mated with the upper jack portion 404 and the lower jack portion 408, respectively. Since the upper jack portion 404 and the latch portion 406 may be recessed with respect to the lower jack portion 408, the upper connector plug 424 may be offset with respect to the lower connector plug 428 when both plugs 424 and 428 have mated with the jack portions 404 and 408, respectively.

As a result, there may be more free space around the latch 413 for a human finger 442 to comfortably extend into and comfortably maneuver to manipulate the latch 413 to remove the lower connector plug 428 without the spatial interference of the upper connector plug 424. For example, since the upper connector plug 224 may be offset with respect to the lower connector plug 228, human fingers 442 and 443 may have more space to more easily grasp the lower connector plug 428 and more easily squeeze the latch 413 and the side of the lower connector plug 428 opposite of the latch 413. Consequently, the latch 413 may be caused to unlatch from the latch keeper 411 and the human fingers 442 and 443 may pull the lower connector plug 428 away from the lower jack portion 408.

Figure 4E:
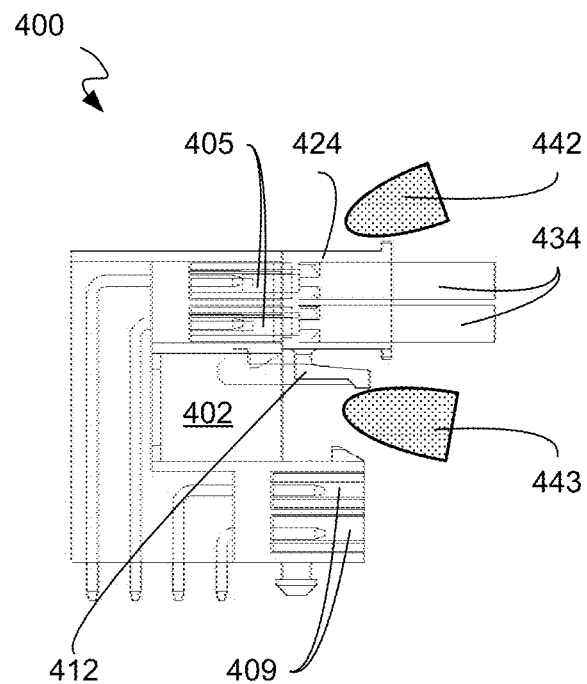
FIG. 4E shows a side view of an exemplary offset stacked power connector with a connector plug in accordance with one embodiment of the present invention.

FIG. 4E shows a side view of the exemplary offset stacked power connector 400 with a connector plug 424 in accordance with one embodiment of the present invention. The connector body 402 of FIG. 4E may be similar to the connector body 402 of FIG. 4A.

Once a lower connector plug has been disconnected, the upper connector plug 424 may be more comfortably disconnected by a user as well. For example, there may be more free space around the latch 412 for a human finger 443 to comfortably extend into and comfortably maneuver to manipulate the latch 412 to remove the upper connector plug 424 without the spatial interference of the lower connector plug.

Figure 4F:
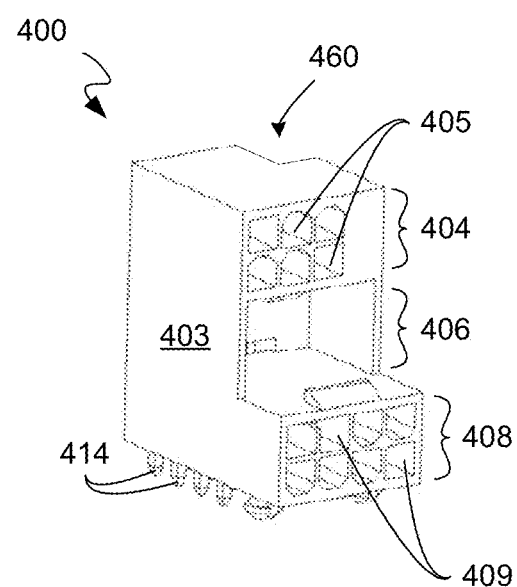
FIG. 4F shows a perspective view of an exemplary offset stacked power connector with an indented body in accordance with one embodiment of the present invention.

FIG. 4F shows a perspective view of an exemplary offset stacked power connector 500 with an indented body 502 in accordance with one embodiment of the present invention. The connector body 403 of FIG. 4F may be similar to the connector body 402 of FIG. 4A. However, the connector body 403 of FIG. 4F may include an inset or indentation 460.

In some embodiments, the upper jack portion 404 may include fewer pin receptacles 405 than the lower jack portion 408. For example, the upper jack portion 404 may include six pin receptacles 405 while the lower jack portion 408 may include eight pin receptacles 409. As a result, there may be no pin receptacles or upper solder tails on the rightmost side of the connector body 403 if the pin receptacles 405 are positioned on the leftmost side of the connector body 403.

Accordingly, the connector body 403 may include an indentation 460 since there may be no upper solder tails to be enclosed and/or protected by the connector body 403. The indentation 460 may extend from the upper end of the connector body 403 to the lower end of the connector body 403 that mounts on a PCB. As a result, the connector body 403 occupies less area on a PCB. Since the indentation 460 may be located on a corner of the connector body 403 that is closest to a fan, the fan may be even larger or have more positioning options. Further, the manufacturing cost of the connector body 403 may be reduced since less material will be used for manufacturing the connector body 403.

It should be appreciated that the upper jack portion 404 may be positioned on the rightmost side of the connector body 403 and that the indentation may be positioned on the leftmost side of the connector body 403. As a result, more area may be provided to a fan that is instead located on the left side of the connector body 403.

FIG. 5A shows a perspective view of an exemplary offset stacked power connector 500 with a rotated upper jack portion 504 and exposed solder tails 515 in accordance with one embodiment of the present invention. The connector body 502 of FIG. 5A may be similar to the connector body 402 of FIG. 4A.

However, the pin receptacles of the upper jack portion 504 may be rotated 180 degrees with respect to the pin receptacles 405 of FIG. 4A. In addition, a keeper 510 may be positioned on the top and outside of the connector body 502. As a result, a connector plug 524 may mate with the upper jack portion 504 in a rotated orientation with respect to the connector plug 424 of FIG. 4B, while a latch 512 may interact with the keeper 510. Consequently, there may be more space to accommodate a human finger to manipulate the latch 512 and the latch 513.

In addition, as a consequence of the rotated orientation of the upper jack portion 504, each of the upper solder tails 514 may be used for different purposes than when the upper jack portion 504 is oriented as in FIG. 4B. Since the upper solder tails 514 may be used for different purposes, the upper solder tails 514 may be exposed instead of being enclosed up to the PCB connection area of the connector body 502 by the connector body 502 to protect the solder tails from inadvertent contact. It should be appreciated that in some embodiments the arrangement of the pin receptacles of the lower jack portion may be rotated 180 degrees with respect to the pin receptacles 409 of FIG. 4A, regardless of whether the arrangement of the pin receptacles of the upper jack portion 504 are rotated.

FIG. 5B shows a pin diagram 501 of the exemplary offset stacked power connector 402 of FIGS. 4A-4D in accordance with one embodiment of the present invention. The upper pin section 564 may correspond to the upper solder tails 414 of FIGS. 4A-4D while the lower pin section 568 may correspond to the lower solder tails 418 of FIGS. 4A-4D.

The top row of the upper pin section 564, which corresponds to the rearmost solder tails of FIGS. 4A-4D, may include power pins. The bottom row of the upper pin section 564 may include ground and sense pins. Since the rearmost solder tails may include power pins, components of a graphics card or a power source may be damaged if the rearmost solder tails are inadvertently contacted without the protection of an enclosure since the power pins are the most exposed pins.

FIG. 5C shows a pin diagram 505 of the exemplary offset stacked power connector 502 with a rotated upper jack portion 504 and exposed solder tails 515 in accordance with one embodiment of the present invention. The upper pin section 574 may correspond to the upper solder tails 515 of FIG. 5A while the lower pin section 578 may correspond to the lower solder tails 518 of FIG. 5A.

Since the orientation of the upper jack portion 504 has been rotated, the pin layout or arrangement of the upper pin section 574 will be rotated as well. For example, the top row of the upper pin section 574, which corresponds to the rearmost solder tails 515 of FIG. 5A, may now include the ground and sense pins. The bottom row of the upper pin section 564 may now include the power pins. Since the rearmost solder tails 515 no longer include power pins, damage to components of the graphics card or the power source may be minimized or eliminated if the rearmost solder tails 515 are inadvertently contacted without the protection of an enclosure.

Consequently, the connector body 502 may enclose and protect every rear pin except for the rearmost solder tails 515. As a result, the manufacturing cost of the connector body 502 may be reduced since less material will be used for manufacturing the connector body 502. Further, since the connector body does not extend to the rear of the rearmost solder tails 515, the connector body 502 occupies less area on a PCB, allowing a fan to be larger or have more positioning options. In addition, similar to the connector body 403 of FIG. 4F, the upper solder tails 514 may be positioned on the leftmost side of the connector body 502. As a result, the offset stacked power connector 500 may occupy less space, allowing the fan to be even larger or have more positioning options.

In various embodiments, a rotated upper jack portion may be included in a stacked power connector without an offset lower jack portion. For example, the stacked power connector 200 of FIG. 2A may include a rotated upper jack portion.

It should be appreciated that embodiments of the present invention may allow for stacked power connectors with more than two jack portions. For example, a stacked power connector may include three or more jack portions that are stacked with and separated by latch sections.

In some embodiments, each jack portion may include any number of pin receptacles. For example, the upper jack portion may include more pins than the lower jack portion, e.g., an upper jack portion may include eight pins while a lower jack portion may include six pins. Alternatively, the upper jack portion may include fewer pins than the lower jack portion. For example, an upper jack portion may include four pins while a lower jack portion may include six pins. In addition, both an upper jack portion and a lower jack portion may include the same number of pins.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An electronic connector comprising:
    a single connector body;
    a mounting end operable to couple said single connector body with an electronic board of an electronics unit;
    a lower jack portion disposed in said single connector body and comprising a plurality of lower pin receptacles, wherein said lower jack portion is disposed adjacent to said mounting end and is operable to receive a first connector end of a first cable;
    an upper jack portion disposed in said single connector body and comprising a plurality of upper pin receptacles, wherein said upper jack portion is disposed above said lower jack portion and is operable to receive a second connector end of a second cable;
    a plurality of lower rear pins that extend from said plurality of lower pin receptacles to a mounting plane defined by said mounting end;
    a plurality of upper rear pins that extend from said plurality of upper pin receptacles to said mounting plane defined by said mounting end;
    said plurality of upper pin receptacles is fewer in number than said plurality of lower pin receptacles and said plurality of upper rear pins is fewer in number than said plurality of lower rear pins;
    said plurality of upper pin receptacles and said plurality of upper rear pins are disposed to a side of said single connector body; and
    said plurality of upper pin receptacles occupies less area on said mounting plane than said plurality of lower pin receptacles.

2. The electronic connector of claim 1, wherein said single connector body is constructed from a single and continuous material and said electronic board is specific to a graphics card comprising a graphics processor unit.

3. The electronic connector of claim 1, further comprising a lower latch keeper disposed adjacent to said lower jack portion and an upper latch keeper disposed adjacent to said upper jack portion.

4. The electronic connector of claim 1, wherein said first and second connector ends each comprise power supply pins.

5. An electronic connector comprising:
    a connector body;
    a mounting end operable to couple said connector body with an electronic board of an electronics unit;
    a lower jack portion disposed in said connector body and comprising a plurality of lower pin receptacles, wherein said lower jack portion is disposed adjacent to said mounting end and is operable to receive a first connector end of a first cable;
    an upper jack portion disposed in said connector body and comprising a plurality of upper pin receptacles, wherein said upper jack portion is disposed above said lower jack portion and is operable to receive a second connector end of a second cable, and further wherein a lower mating plane defined by said lower jack portion is offset from an upper mating plane defined by said upper jack portion;
    a plurality of lower rear pins that extend from said plurality of lower pin receptacles to a mounting plane defined by said mounting end;
    a plurality of upper rear pins that extend from said plurality of upper pin receptacles to said mounting plane defined by said mounting end;
    said plurality of upper pin receptacles is fewer in number than said plurality of lower pin receptacles and said plurality of upper rear pins is fewer in number than said plurality of lower rear pins;
    said plurality of upper pin receptacles and said plurality of upper rear pins are disposed to a side of said connector body and said connector body is indented on an opposite side; and
    said plurality of upper pin receptacles occupies less area on said mounting plane than said plurality of lower pin receptacles.

6. The electronic connector of claim 5, wherein said connector body is constructed from a single and continuous material and said electronic board is specific to a graphics card comprising a graphics processor unit.

7. The electronic connector of claim 5, further comprising a lower latch keeper disposed adjacent to said lower jack portion and an upper latch keeper disposed adjacent to said upper jack portion.

8. The electronic connector of claim 5, wherein said first and second connector ends each comprise power supply pins.

9. The electronic connector of claim 5, wherein said connector body encloses said plurality of lower rear pins and said plurality of upper rear pins up to said mounting end.

10. The electronic connector of claim 5, wherein:
    said plurality of upper pin receptacles is fewer in number than said plurality of lower pin receptacles and said plurality of upper rear pins is fewer in number than said plurality of lower rear pins;
    said plurality of upper pin receptacles and said plurality of upper rear pins are disposed to a side of said connector body and said connector body is indented on an opposite side; and
    said plurality of upper pin receptacles occupies less area on said mounting plane than said plurality of lower pin receptacles.

11. The electronic connector of claim 5, wherein said upper latch keeper is disposed on the outside and on an upper end of said connector body opposite of said mounting end.

12. The electronic connector of claim 5, wherein said upper jack portion is operable to couple with a power connector plug comprising a latch when said power connector plug is oriented with said latch facing away from said mounting end.

13. A graphics card comprising:
   an electronic board;
   a graphics processor unit;
   a fan; and
   an electronic connector comprising:
      a connector body;
      a mounting end operable to couple said connector body with said electronic board;
      a lower jack portion disposed in said connector body and comprising a plurality of lower pin receptacles, wherein said lower jack portion is disposed adjacent to said mounting end and is operable to receive a first connector end of a first cable; and
      an upper jack portion disposed in said connector body and comprising a plurality of upper pin receptacles, wherein said upper jack portion is disposed above said lower jack portion and is operable to receive a second connector end of a second cable;
      a plurality of lower rear pins that extend from said plurality of lower pin receptacles to a mounting plane defined by said mounting end;
      a plurality of upper rear pins that extend from said plurality of upper pin receptacles to said mounting plane defined by said mounting end;
      said plurality of upper pin receptacles is fewer in number than said plurality of lower pin receptacles and said plurality of upper rear pins is fewer in number than said plurality of lower rear pins;
      said plurality of upper pin receptacles and said plurality of upper rear pins are disposed to a side of said single connector body and said connector body is indented on an opposite side; and
      said plurality of upper pin receptacles occupies less area on said mounting plane than said plurality of lower pin receptacles.

14. The graphics card of claim 13, wherein a lower mating plane defined by said lower jack portion is offset from an upper mating plane defined by said upper jack portion.

15. The graphics card of claim 13, wherein said connector body is mounted on an edge of said electronic board and is operable to transfer electrical power or signals from said first and second cables.

* * * * *